D. THAXTER.
Spectacles.
No. 1,174.
Patented June 18, 1839.
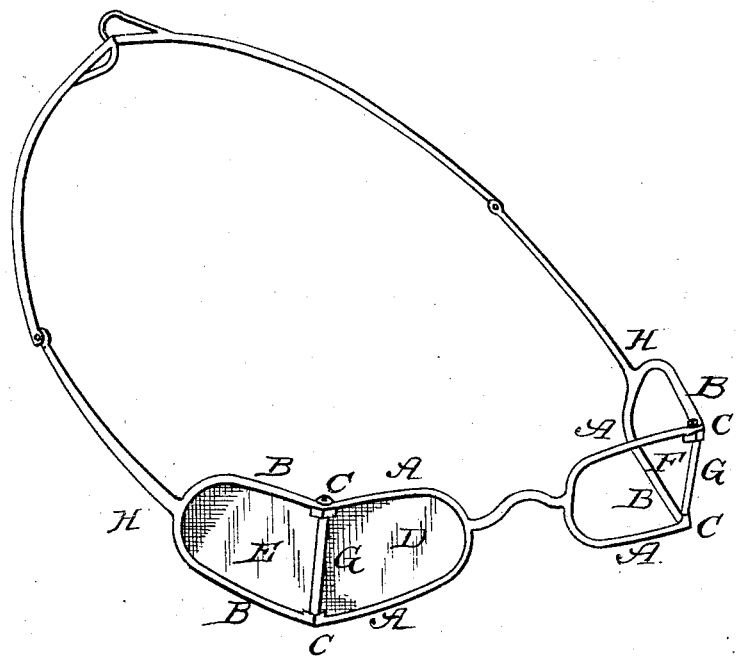

UNITED STATES PATENT OFFICE.

DANIEL THAXTER, OF HINGHAM, MASSACHUSETTS.

SPECTACLES.

Specification of Letters Patent No. 1,174, dated June 18, 1839.

*To all whom it may concern:*

Be it known that I, DANIEL THAXTER, of Hingham, in the county of Plymouth and Commonwealth of Massachusetts, have invented a new and useful Improvement in Spectacles with Side Glasses; and I do hereby declare that the following is a full and exact description of the same.

The improvement consists in placing the joints which connect the frame of the front (see drawing, front frames A A) with the frames of the side glasses (side frames B B,) in the outer edges of the frames (joint C C, front glasses D, side glasses E,) and by connecting the same together by a screw (the glasses at F, are omitted to show the screws, G,) instead of a continuous joint across the entire angle where the front and side frames unite by which continuous joint the sight would be more obstructed than by the screws.

The improvement consists further in attaching the bows to the frames of the side glasses (at H,) instead of continuing them across the side glasses to the joint or angle where the front and sides meet and in inserting the side glasses in the frame to which the bows are attached instead of inserting them in a separate frame detached from the bows and united with the front frame at the joint or angle aforesaid. In other respects the spectacles are made in a similar manner to those in common use.

By inserting the bows to the frames in which the side glasses are inserted the whole frame is made neater, more compact, and of greater strength. The improvement is equally adapted to spectacles with side glasses whether intended for shades or not.

What I claim as my invention and desire to secure by Letters Patent are—

The joints uniting the frames of the front and side glasses of the spectacles so as to bring the front and side glasses in contact and also the attaching the bows to the frames of the side glasses instead of continuing them across the side glasses, to the joints, all substantially as hereinbefore described.

DANIEL THAXTER.

Witnesses:
   SOLOMON LINCOLN,
   JOSEPH B. THAXTER.